United States Patent [19]

Dearman

[11] 4,392,641
[45] Jul. 12, 1983

[54] ALIGNMENT TOOL

[76] Inventor: Timothy C. Dearman, P.O. Box 937, Pearland, Tex. 77581

[21] Appl. No.: 302,970

[22] Filed: Sep. 17, 1981

[51] Int. Cl.³ .............................................. B25B 5/14
[52] U.S. Cl. ..................................... 269/49; 33/180 R
[58] Field of Search ................. 33/180 R; 269/49, 43, 269/47, 243; 29/271, 272, 260

[56] References Cited

U.S. PATENT DOCUMENTS

| 359,815 | 3/1887 | Sargent | 269/49 |
| 2,031,398 | 2/1936 | Wagoner | |
| 3,594,890 | 7/1971 | Cordell | 29/260 |
| 3,762,068 | 10/1973 | Clay | 33/180 R |
| 3,869,801 | 3/1975 | Lycan | |
| 4,175,734 | 11/1979 | Williams | 269/49 |
| 4,175,735 | 11/1979 | Griffin | 269/49 |

FOREIGN PATENT DOCUMENTS 551276 2/1943 United Kingdom ................. 269/49

Primary Examiner—Robert C. Watson
Attorney, Agent, or Firm—Learman & McCulloch

[57] ABSTRACT

A tool for use in preparing two members to be welded to one another has a body provided with legs adapted to straddle a gap between the two members and a bridge joining corresponding ends of the legs. The bridge has an elongate slot therein through which extends a drawbar that terminates at one end in a hook which is capable of underlying and engaging the lower surface of only one of such members. The drawbar is adjustable to cause the hook to move toward the bridge and thereby effect relative adjustment of the confronting edges of the two members. The drawbar preferably carries a gauge which may be used to ascertain the relative positions of the lower surfaces of the two members.

7 Claims, 5 Drawing Figures

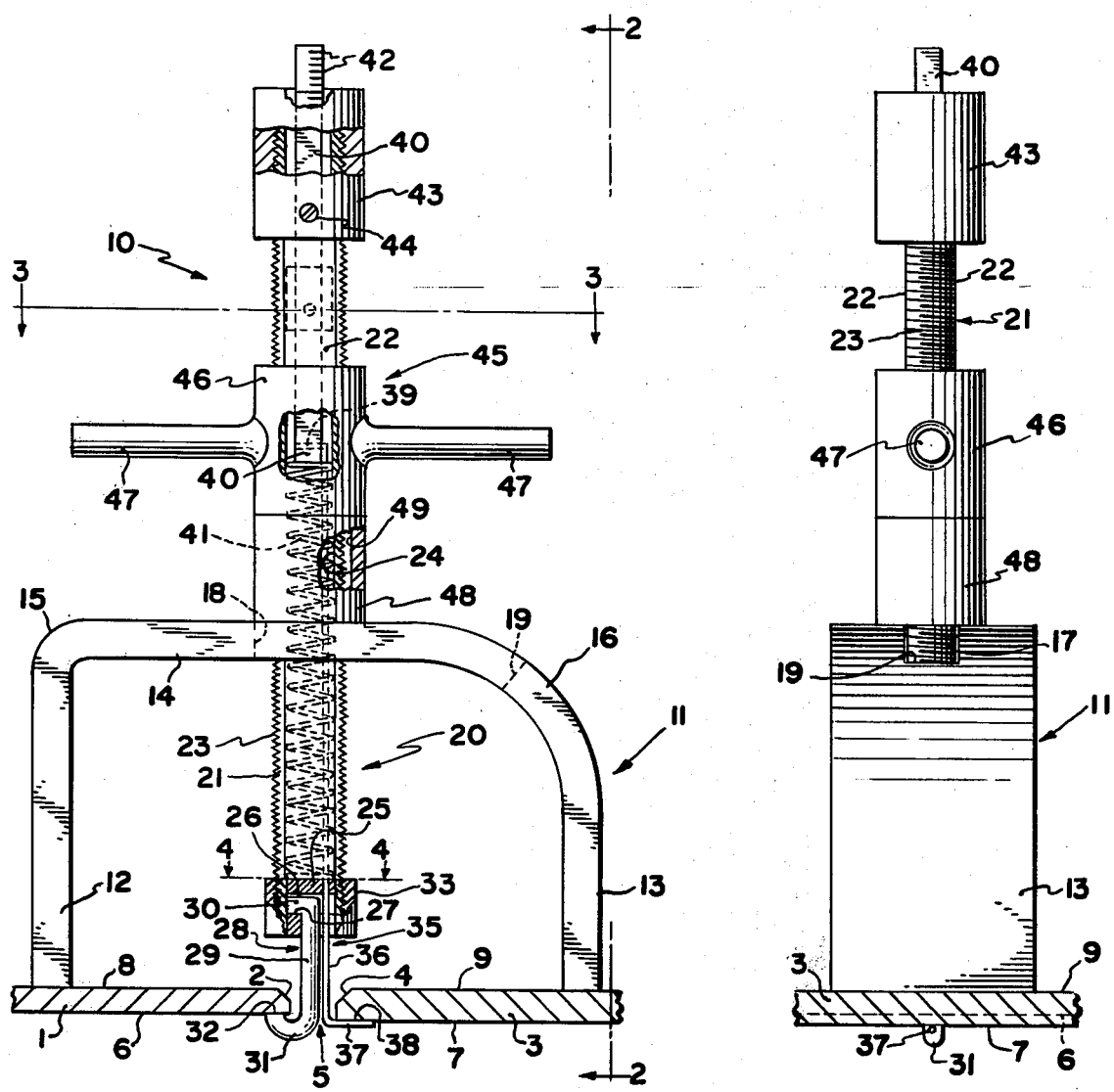
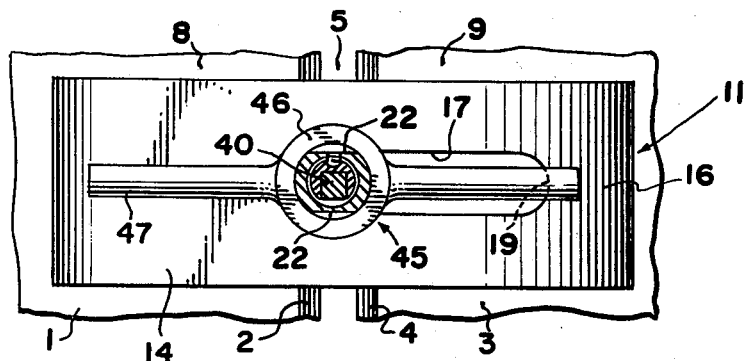

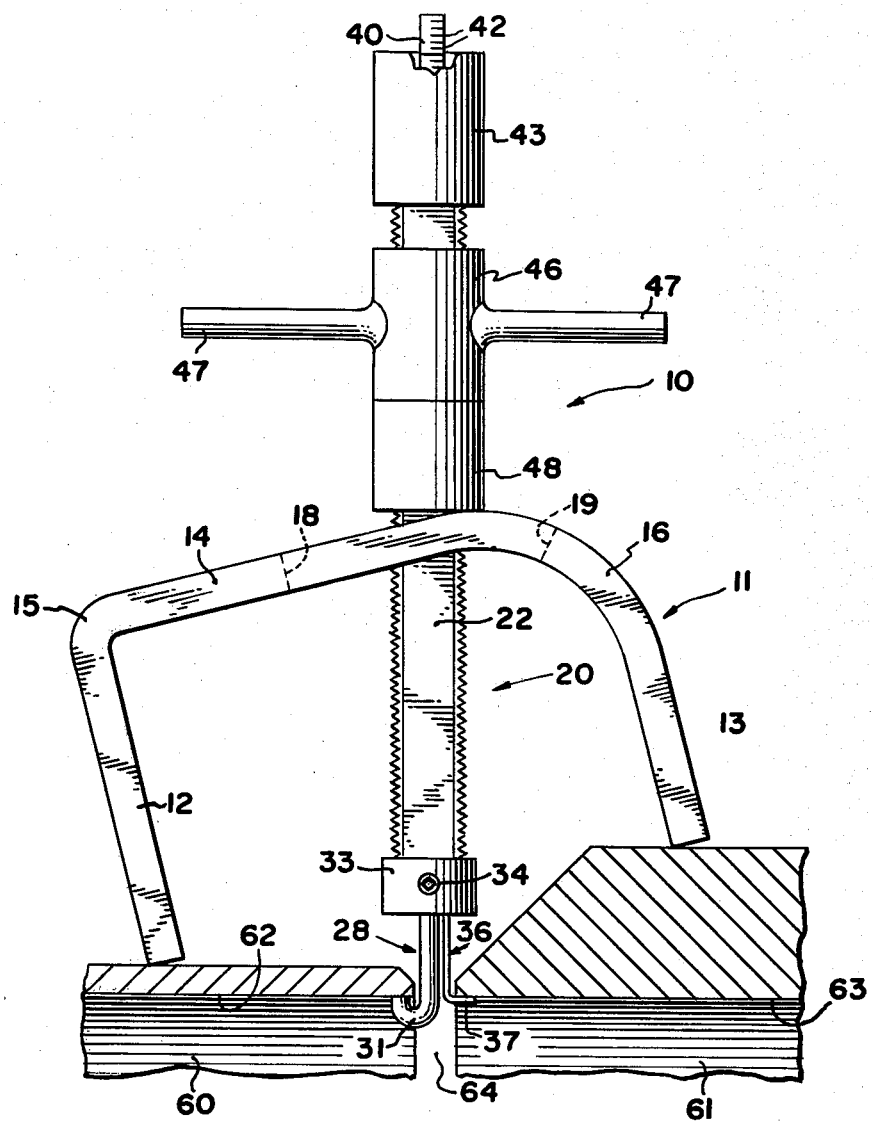

ALIGNMENT TOOL

BACKGROUND OF THE INVENTION

Preparatory to welding a pair of metal members such as plates, pipes, fittings, and the like to one another it is necessary that the two members be so positioned relatively to one another that a proper weld may be achieved. In preparing the two members to be welded together, they usually are positioned adjacent one another with the edges to be welded confronting one another and spaced by a gap. It is rather uncommon for the confronting edges of the two members to match perfectly. On the contrary, more often than not the confronting edges are mismatched. That is, warpage of plates and out-of-roundness of pipes commonly will cause the surfaces of one member to be higher or lower than the corresponding surfaces of the other member, a condition which commonly is referred to as "high-low". To rectify a high-low condition, it is customary to use various kinds of shims, clamps, and the like so as to cause a low surface to be raised and a high surface to be lowered until they match or are in a desired relationship.

Among the tools heretofore proposed for rectifying high-low conditions are those disclosed in U.S. Pat. Nos. 4,175,734 and 4,175,735. These tools function well in those instances in which corresponding surfaces of two members are to be positioned in the same plane, but there are many instances in which such a relationship is not desired. For example, if a pipe having a relatively thick wall is to be welded to a pipe having a relatively thin wall, or if a relatively thick plate is to be welded to a relatively thin plate, then both corresponding surfaces of the two pipes or the two plates will not and cannot be coplanar.

When tools of the kind disclosed herein and in the two patents mentioned above are in use, it is not possible to effect a weld at the positions occupied by such tools. Thus, even though corresponding surfaces of two members may be coplanar at the position of the tool, a high-low condition may exist at a zone somewhat removed from a tool. If such high-low condition is to be remedied, therefore, the tool must be capable of effecting relative movement of the members at the location of the tool in an amount sufficient to overcome the high-low condition at such remote zone.

Other undesirable characteristics of some of the known tools are that they cannot be used on members of different shapes or in cases in which the tools cannot be disposed in a position that is either parallel or perpendicular to the members to be welded together. A tool constructed in accordance with the present invention, however, is sufficiently versatile to adapt to conditions in which parallelism or perpendicularity is not essential.

Another problem associated with tools of the kind heretofore in use is that it cannot always be determined when the high-low condition has been wholly rectified. A tool constructed in accordance with the present invention, however, may include a gauge which enables extremely accurate adjustment of the relative positions of the members to be obtained.

SUMMARY OF THE INVENTION

A tool constructed in accordance with the invention comprises a body having two legs spaced by a bridge in which there is a slot for the accommodation of a drawbar having a threaded exterior and a bore extending therethrough. At that end of the drawbar which lies between the legs of the body is a hook-like leg one end of which is removably anchored to the drawbar and the opposite end of which is free.

Loosely encircling the drawbar and bearing against the bridge of the body is a thrust member against which bears a rotary drive member that is in threaded engagement with the drawbar.

Also projecting from that end of the drawbar which lies between the legs of the body is a gauge having a finger projecting laterally of the drawbar and which is secured at its other end to a rod which is reciprocable in the bore of the drawbar and is urged in one direction by a spring. The bar has a calibrating scale at its free end which normally projects beyond the corresponding end of the drawbar and the latter is fitted with a calibrating sleeve that is threaded onto the drawbar for adjustment longitudinally thereof to any one of a number of selected, fixed positions.

The opening or slot in the bridge of the body member is of such length as to enable the drawbar to be adjusted from a position in which it is midway between the legs to a selected one of a number of other positions closer to one of the legs. Such one leg preferably is joined to the bridge along an arc of greater radius than the radius of the juncture between the bridge and the opposite leg, and the slot extends along a portion of the arcuate juncture. The drawbar thus is capable of occupying any one of several positions parallel to both legs of the body and perpendicular to the bridge, or other positions in which the drawbar extends at an angle to the bridge and to the body legs.

DESCRIPTION OF THE DRAWINGS

FIG. 1 is a view partly in side elevation and partly in section of an alignment tool constructed according to a preferred embodiment of the invention and illustrating it applied to a pair of plates of unequal thickness;

FIG. 2 is a sectional view taken on the line 2—2 of FIG. 1;

FIG. 3 is a sectional view taken on the line 3—3 of FIG. 1;

FIG. 4 is a sectional view taken on the line 4—4 of FIG. 1; and

FIG. 5 is a view similar to FIG. 1, but illustrating the tool in use with two different kinds of members that are to be welded to one another.

DETAILED DESCRIPTION

The tool illustrated in FIG. 1 is shown as being used in association with a first plate member 1 having a beveled end 2 and a second plate member 3 having a beveled end 4 confronting, but spaced from the end 2 of the plate 1 so as to provide a gap 5 between the plates. The thickness of the plate 1 is illustrated as being less than that of the plate 3 and the lower surface 6 of the plate 1 is at a level higher than that of the lower surface 7 of the plate 3. The upper surface 8 of the plate 1, however, is coplanar with the upper surface 9 of the plate 3. For purposes of discussion it will be assumed that the plates 1 and 3 are to be welded together so that their upper surfaces 8 and 9 are coplanar, but that such surfaces are not coplanar until acted upon by the tool hereinafter described.

The alignment tool is designated generally by the reference character 10 and comprises a body 11 having a pair of spaced apart legs 12 and 13 joined at corresponding ends by a bridge 14. The opposite or free ends of the legs are coplanar. The juncture 15 between the leg 12 and the bridge 14 may be fairly abrupt, whereas the juncture 16 between the leg 13 and the bridge 14 is formed on an arc having a radius considerably larger than that of the juncture 15. The bridge 14 has an elongate slot or opening 17 therein, one end 18 of which is parallel to the leg 12 and the opposite end 19 of which is inclined to the leg 12. The end 18 of the slot is located adjacent the middle of the bridge 14, whereas the end 19 is adjacent the leg 13 and extends into the curved juncture 16.

The alignment tool 10 includes a drawbar 20 comprising an elongate stem 21 having two of its sides 22 flattened and the remaining exterior surface of which is threaded as at 23. The size and shape of the stem are such that it is slidable within the slot 17, but cannot rotate relatively to the body 11. The stem has a bore 24 extending therethrough. At one end of the stem 21 a plug 25 is fitted into the bore 24. The plug 25 has a transverse slot 26 which extends from one end thereof toward, but terminates short of the opposite side, and adjacent the opposite side is a shoulder 27.

Removably secured to the drawbar is a hook member 28 having a central section 29 from one end of which extends a finger 30 that is fitted into the slot 26 and overlies the shoulder 27. At its other end the section 29 terminates in a reversely turned foot 31 having a flat end surface 32. Threaded onto the stem 21 is a retaining ring 33 and fitted into an opening in the ring 33 and into a corresponding opening in the stem 21 is a set screw 34 by means of which the member 28 is securely, but removably, connected to the stem 21.

An optional gauge 35 has an elongate section 36 which extends freely through the slot 26 in the plug 25 and terminates at its lower end in a laterally extending finger 37 having a horizontal surface 38. The other end of the section 36 terminates in a laterally extending finger 39 which removably is accommodated in an opening formed at one end of a rod 40 which seats on one end of a compression spring 41 fitted into the bore 24 of the stem 21. The opposite end of the spring 41 seats on the plug 25. The spring 41 constantly acts on the rod 40 urging it toward that end of the stem 23 that is opposite the plug 25 and the rod 40 is of such length as normally to have an end portion extending beyond the corresponding end of the stem. The projecting end of the rod 40 may be provided with calibrating indicia 42 which cooperates, in a manner later to be described, with a calibrating cap 43 threaded onto the stem 21 and adapted to be secured at any selected position of adjustment axially of the stem by means of a set screw 44.

A driving member 45 comprises an interiorly threaded sleeve 46 mounted on the stem 21. A pair of driving arms 47 extend from the driving member to facilitate rotation of the latter relative to the stem 21. Interposed between the driving member 46 and the bridge 14 of the body 11 is a thrust ring 48 having a smooth bore 49 that is sufficiently larger in diameter than that of the stem 21 to enable the bearing member to slide freely along the stem. The outside diameter of the ring 48 corresponds to that of the driving member 46 and is considerably greater than the width of the slot 17 in the bridge 14.

In the use of the tool in conjunction with the plate members 1 and 3 shown in FIGS. 1-3, the plates are supported by suitable means (not shown) with their ends 2 and 4 confronting one another and with the gap 5 therebetween. Initially, the surface 8 is at a level lower than that of the surface 9. The tool is turned 90° from the position shown in FIG. 1 so that the hook 28 and the gauge finger 37 parallel the gap 5. The gap is of such width as to enable the hook 28 and the gauge finger 37 to pass freely through the gap. Once the hook 28 and the finger 37 have passed through the gap, the tool may be turned to the position shown in FIG. 1 wherein the foot 31 underlies the lower surface 6 of the plate 1, the gauge finger 37 underlies the lower surface 7, and the legs 12 and 13 of the tool straddle the gap 5.

The gauge 35 may be calibrated by depressing the rod 40 against the force of the spring 41 until the surface 38 of the gauge finger 37 and the surface 32 of the hook foot 31 are coplanar. The calibrating cap 43 then may be moved axially along the stem 21 until its upper surface is at precisely the level of a selected indicia 42. The set screw 44 then may be seated on the stem 21 so as to fix the cap 43 on the stem. Thereafter, any difference between the levels of the surfaces 32 and 38 of the members 28 and 35 may be read by comparing the distance of the selected indicia 42 from the upper surface of the calibrating cap.

With the foot 31 underlying the plate 1, rotation of the driving member 45 in one direction will cause the drawbar 20 to move upwardly via the thrust member 48, and the hook foot 31 to exert an upward force on the edge 2 of the member 1. As the drawbar 20 moves upwardly, the gauge 35 will remain stationary since the finger 37 is hooked under the edge 4 of the member 3. Thus, the upward movement of the drawbar 20 will cause the calibrating cap 43 to move upwardly toward the free end of the bar 40. When the upper edge of the calibrating cap 43 has moved beyond the selected indicia 42 an amount corresponding to the difference in thickness between the members 1 and 3, the upper surfaces 8 and 9 of the latter will be coplanar and the rotation of the driving member 45 may cease. The members 1 and 3 then may be tack welded adjacent the tool 10, following which the latter may be removed from the members and the welding completed.

FIG. 5 illustrates the use of the tool 10 in a different manner. FIG. 5 illustrates the joining of a relatively thin walled cylindrical pipe 60 to a relatively thick wall 61 of a valve or the like. In this case, it is assumed that the inner surface 62 of the pipe 60 is to be coplanar with the inner surface 63 of the wall 61 and that, initially, the inner surface 62 is at a level lower than that of the inner surface 63.

The tool has its hook foot 31 and gauge finger 37 passed through a gap 64 that exists between the members 60 and 61, following which the tool is rotated so that the hook foot 31 underlies and bears against the inner surface 62 and the finger 37 underlies and bears against the inner surface 63. For the legs 12 and 13 to straddle the gap 64 it is necessary that the free ends of the two legs be located at different levels, as is shown clearly in FIG. 5. This is permitted because the length of the slot 17 is considerably greater than the corresponding dimension of the stem 21. Extension of the slot 17 into the curved juncture 16 permits substantial angulation of the drawbar relative to the bridge. Thus, the stem 21 may occupy a vertical position even though the bridge 14 is at a considerable incline to the horizontal.

Rotation of the driving member 45 when the tool 10 is in the position shown in FIG. 5 will cause the thrust member 48 to bear against the bridge 14 at a position more closely adjacent the leg 13 than to the leg 12.

Thus, the lever arm from the leg 13 to the point at which the thrust member 48 bears against the bridge 14 is shorter than the lever arm from the bearing point to the leg 12. Consequently, upward thrust on the leg 12 enables the body 11 to rock about the free end of the leg 13 and permit the member 60 to move upwardly relative to the member 61. Such upward relative movement may continue until such time as the two surfaces 62 and 63 are coplanar, as indicated by the gauge 35.

It is not essential that the gauge 35 be included as an integral part of the tool, but its inclusion is of considerable convenience since it avoids the necessity of having to use a separate gauge for indicating the correction of a high-low condition.

The hook member 28 and the member 36 of the gauge 35 are replaceable in the event either or both become damaged.

The disclosed embodiment is representative of a presently preferred form of the invention, but is intended to be illustrative rather than definitive thereof. The invention is defined in the claims.

I claim:

1. A welding tool for use in positioning in predetermined locations spaced apart, confronting edges of two members to be welded together, said tool comprising a body having two legs adapted to straddle the space between said edges and a bridge joining said legs, said bridge having an opening therein extending from adjacent the middle of said bridge toward one of said legs and said opening terminating closer to said one leg than to the other of said legs; a drawbar slidably extending through said opening, said drawbar terminating at one end in a laterally extending foot of such width as to pass through the space between said edges and of such length as to engage a surface of a single one of said members adjacent such space, said opening in said bridge having a length greater than the thickness of said drawbar; and means carried by said drawbar for moving said drawbar relatively to said body in a direction to enable said foot to engage such surface of said one of said members and displace such member relatively to the other of said members in the direction of said bridge.

2. A tool according to claim 1 wherein said bridge is joined to one of said legs along a curvature and wherein said opening extends into said curvature.

3. A tool according to claim 1 wherein said legs are free at corresponding ends and extend from said free ends toward and join said bridge, the juncture of one of said legs with said bridge extending along a curvature.

4. A tool according to claim 1 wherein said drawbar has a cross-sectional size and configuration such as to disable it from rotating within said opening.

5. A tool according to claim 1 including a gauge carried by said drawbar and terminating at one end in a finger, said finger extending in a direction opposite said foot to engage a surface of the other of said members.

6. A tool according to claim 5 including means carried by said drawbar and said gauge for calibrating the latter.

7. A welding tool for use in positioning in predetermined locations spaced apart, confronting edges of two members to be welded together, said tool comprising a body having legs adapted to straddle the space between said edges and a bridge joining said legs, said bridge having an opening therein; a drawbar slidably extending through said opening and having a portion thereof located between said legs; a foot separate from said drawbar and of such width as to pass through the space between said edges and of such length as to engage a surface of a single one of said members adjacent such space; means removably securing said foot to said drawbar; and means carried by said drawbar for moving said drawbar relatively to said body in a direction to enable said foot to engage such surface of said one of said members and displace such member relatively to the other of said members in the direction of said bridge, said securing means comprising an elongate portion projecting from said foot toward said drawbar and terminating in a finger removably fitted into said drawbar.

* * * * *